United States Patent [19]
Hehl

[11] 3,788,788
[45] Jan. 29, 1974

[54] INJECTION MOLDING MACHINE

[76] Inventor: Karl Hehl, Sielung 183 D-7291, Lossburgh Wurttenberg, Germany

[22] Filed: Mar. 1, 1972

[21] Appl. No.: 230,738

[30] Foreign Application Priority Data
Mar. 2, 1971   Germany............................ 2109765

[52] U.S. Cl. ............................................. 425/192
[51] Int. Cl. ............................................. B29f 1/02
[58] Field of Search ... 425/242, 154, 171, 186, 214, 425/244, 246, 248, 253, 444, 450, 817, 188, 190, 192; 164/120, 312, 319, 328

[56] References Cited
UNITED STATES PATENTS

| | | | |
|---|---|---|---|
| 2,896,257 | 7/1959 | Norman | 425/190 X |
| 3,564,658 | 2/1971 | Hehl | 425/192 X |
| 3,609,817 | 10/1971 | Deerberg | 425/242 X |
| 3,370,324 | 2/1968 | Hehl | 425/247 X |
| 2,867,002 | 1/1959 | Zalozecky | 425/450 X |
| 2,916,768 | 12/1959 | Quere | 425/450 |
| 3,068,520 | 12/1962 | Hehl | 425/190 |
| 3,596,325 | 8/1971 | Hehl | 425/192 |
| 3,406,429 | 10/1968 | Draudt | 425/186 X |
| 3,557,663 | 1/1971 | Florjancic | 425/242 X |
| 3,666,387 | 5/1972 | Cyriax | 425/444 X |

Primary Examiner—J. Spencer Overholser
Assistant Examiner—John S. Brown
Attorney, Agent, or Firm—Spencer and Kaye

[57] ABSTRACT

An injection molding machine in which an injection unit is releasably connected to a mold clamping unit for injection transversely of the mold parting line, the injection unit having a plurality of supporting struts centered and releasably fastened to an equal plurality of auxiliary cylinders of the mold clamping unit.

12 Claims, 9 Drawing Figures

INJECTION MOLDING MACHINE

BACKGROUND OF THE INVENTION

The present invention relates to injection molding machines, and more particularly to injection molding machines having a mold clamping unit with a hydraulic system, and at least one injection unit which can be releasably connected to the mold clamping unit in such a manner that it is possible to inject plastic material transverse to the mold parting line. The hydraulic system includes hydraulic pressure cylinders which provide the closing pressure for the mold clamping unit, with these cylinders being formed by a cylinder, carrying mold piece or assembly at whose frontal side a stationary mold half is supported, while a movable mold half is held by a carrier which is disposed on the piston rods of the pistons of the hydraulic pressure cylinders; and auxiliary cylinders which are coaxially flanged to the hydraulic pressure cylinders and within which a pressure is developed to open the mold. The pistons within the auxiliary cylinders are connected to move as a unit with the pistons of the hydraulic pressure cylinders.

In an injection molding machine of comparable type but which does not have coaxial auxiliary cylinders, the injection unit can be connected to connecting sleeves of the cylinder carrying mold assembly on the frontal side facing away from the mold when injecting transversely to the parting line of the mold. Also, this injection unit or a further injection unit can be connected to the cylinder carrying mold assembly with the aid of a carriage guided along the longitudinal side thereof so that the injection unit can be used to inject into or longitudinally of the parting line of the mold. In this way it is possible to select either injection transverse to or longitudinally of the mold parting line, or a simultaneous injection transverse as well as longitudinally of the mold parting line. Such an injection molding machine is described in German Offenlegungsschrift No. 1,778,350.

It is also known in injection molding machines to arrange auxiliary cylinders coaxial with the hydraulic pressure cylinders, with the pistons of the auxiliary cylinders moving as a unit with the pistons of the main cylinders or hydraulic pressure cylinders, respectively. With a hydraulic drive system comprising hydraulic pressure cylinders and coaxial auxiliary cylinders, various drive functions can be performed in a simple manner. For example, reference is made to French Patent No. 939,315, and in particular to FIG. 5 thereof. Another example is the machine disclosed in U.S. Pat. No. 3,327,474 in which the lifting stroke of the pistons of the hydraulic pressure cylinders can be used to produce the closing pressure and the mold can be opened by charging the pistons of the auxiliary cylinders. Still another example is the machine disclosed in Swiss Patent No. 496,536, and in particular FIGS. 1,3, 4 and 5 thereof.

SUMMARY OF THE INVENTION

It is therefore a general object of the present invention to provide an injection molding machine of the above-mentioned type with a simple hydraulic drive system so that a simple and compact construction of the injection unit results with its connecting and centering devices easily accessible and actuatable.

It is a more specific object of the present invention to provide an injection molding machine of the type described in which the injection unit is provided with supporting struts which are centered and releasably fastened to the mold clamping unit.

It is a related object of the present invention to provide an injection molding machine of the type described in which the supporting struts are coaxially connected to auxiliary cylinders of the mold clamping unit.

It is another related object of the present invention to provide an injection molding machine of the type described in which the auxiliary cylinders are provided with centering chambers in which the supporting struts are engaged.

It is another specific object of the present invention to provide an injection molding machine of the type described in which the injection unit is held by a bridge structure within which hydraulic actuating cylinders are formed.

It is a related object of the present invention to provide an injection molding machine of the type described in which the supporting struts simultaneously serve as injection unit supports and as piston rods for the hydraulic actuating cylinders.

It is another related object of the present invention to provide an injection molding machine of the type described in which the pistons of the hydraulic actuating cylinders form a composite structure.

It is still another specific object of the present invention to provide an injection molding machine of the type described in which the pressure developed by the material accumulation at the front portion of the conveying worm prior to the injection stroke is relaxed.

These and other objects are accomplished according to the present invention by the provision of supporting struts for the injection unit which are centered and releasably mounted to auxiliary cylinders of the mold clamping unit.

Advisably the supporting struts of the injection unit are coaxially connected to the auxiliary cylinders.

In one preferred embodiment, the supporting struts simultaneously serve as injection unit supports and as the piston rods for the pistons of the hydraulic actuating cylinders which move the injection unit toward and away from the mold and also remove it therefrom, if so desired, with the actual cylinders for the hydraulic actuating cylinders being preferably formed by bores in a bridge structure which holds the injection unit.

Advantageously the auxiliary cylinders are provided with a centering chamber at one end thereof in which the supporting struts are engaged.

DESCRIPTION OF THE PREFERRED EMBODIMENTS

Figure 1:
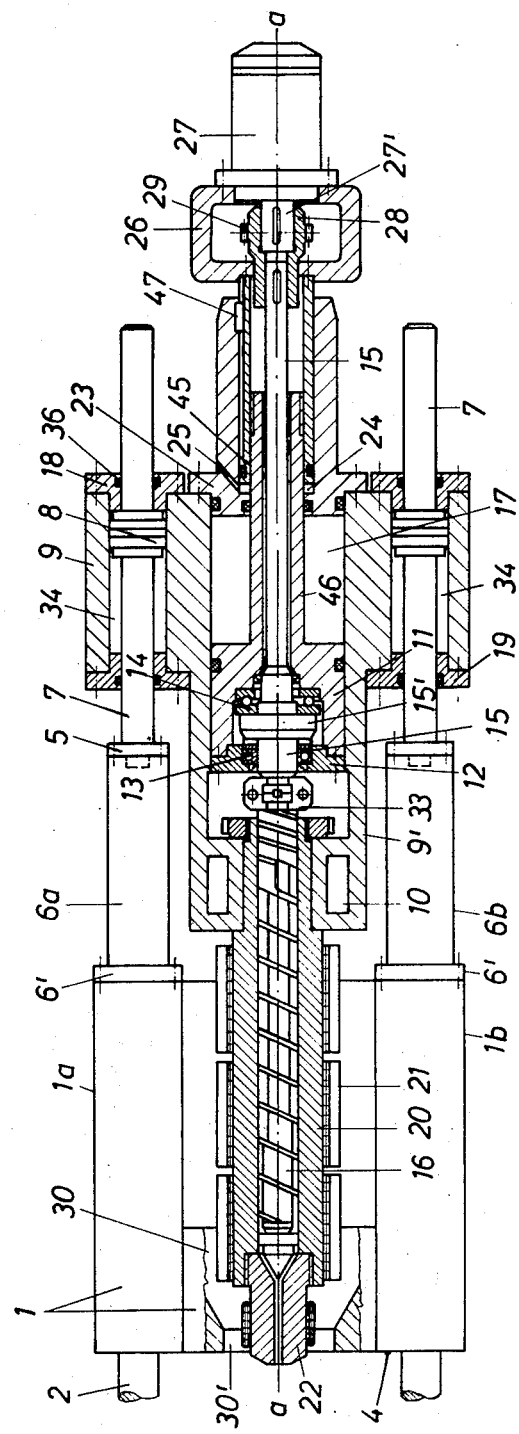
FIG. 1 is a plan view partially in cross section of an injection molding machine according to the present invention with the machine base, the mold and the mold carrier for the movable mold half removed for clarity.
Figure 4:
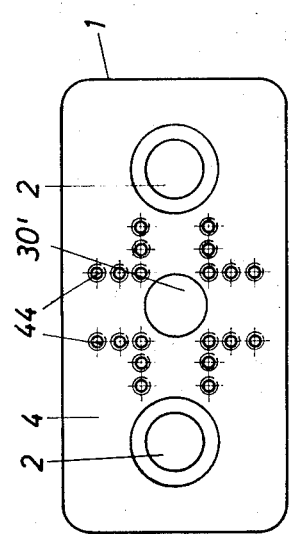
FIG. 4 is a rear view in elevation of the cylinder carrying mold assembly according to the present invention with flange connected auxiliary cylinders.
Figure 3:
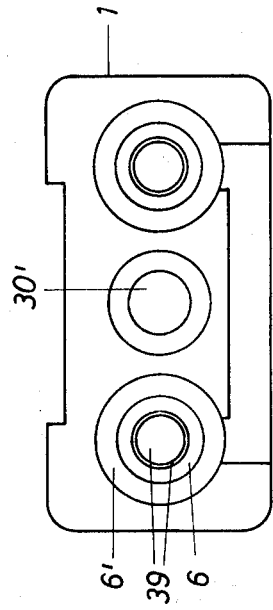
FIG. 3 is a front view in elevation of the cylinder carrying mold assembly of FIGS. 1 and 2.
Figure 2:
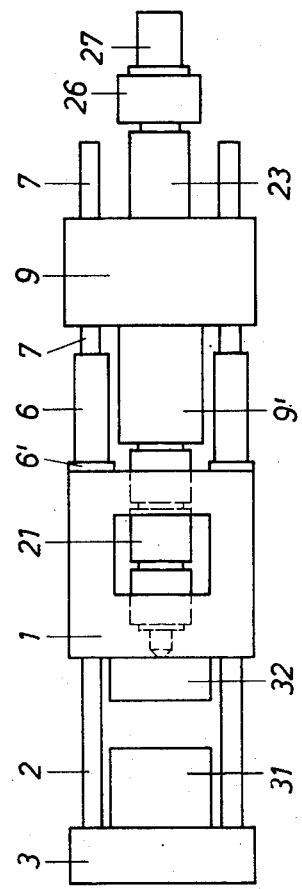
FIG. 2 is a plan view of the injection molding machine of FIG. 1 to a smaller scale with the machine base removed for clarity.

Referring now to the drawings, and particularly FIGS. 1 and 2, a machine base (not shown) holds a relatively large cylinder carrying mold piece or assembly 1 of a mold clamping unit. The assembly 1 has an approximately rectangular cross section (FIGS. 3 and 4) and is provided with a centrally located passage 30 and a channel 30' for receiving a plasticizing cylinder 20. The mold assembly 1 forms two hydraulic drive or pressure cylinders 1a, 1b. The pressure cylinders 1a, 1b have developed therein the pressure necessary for closing the mold. The pistons (not shown) of the pressure cylinders 1a, 1b are disposed in bores formed by the cylinders. Although the present invention is disclosed as having two pressure cylinders, it should be understood that other configurations are possible, for example, four pressure cylinders could be provided. At the frontal face 4 of the cylinder carrying mold assembly 1, a stationary mold half 32 is supported. The stationary mold half 32 is centered with respect to the channel 30' and fastened with appropriate means (not shown) engaging in the fastening holes 44 as seen in FIG. 3.

A movable mold half 31 as can be seen in FIG. 2, is held by a carrier 3. The carrier 3 in turn is disposed on the piston rods 2 of the pistons of the pressure cylinders 1a, 1b.

The cylinder carrying mold assembly 1 is the nucleus of the mold clamping unit and bears both the mold halves 31, 32 and the injection unit. It bears the injection unit regardless of whether the injection unit injects material transverse to or longitudinally of the parting line of the mold halves 31, 32. In the latter case, a carriage (not shown) is displaceably mounted in guides (also not shown) on one longitudinal side of the cylinder carrying mold assembly 1, and supports the struts 7 of the injection unit.

The injection unit can thus be selectively set to inject transverse to or longitudinally of the parting line. It is also possible to simultaneously inject with two injection units transverse to and longitudinally of the parting line.

The mold clamping unit has coaxially fastened by means of flanges 6' to the two pressure cylinders 1a, 1b auxiliary cylinders 6a, 6b, respectively. The auxiliary cylinders 6a, 6b each have a piston (not shown) mounted therein which together with the pistons mounted within the pressure cylinders 1a, 1b form an assembly which moves as a unit. The assembly can be formed by mounting the pistons on a common shaft, for example. A hydraulic system formed by the mold clamping unit and consisting of the pressure cylinders 1a, 1b and the auxiliary cylinders 6a, 6b makes it possible to open and close the mold with the application of a relatively low force, and to exert a relatively high force when the mold is closed. The low force is produced when the pressure in the hydraulic system ranges between approx. 700 – 850 psig and the high force is produced when the pressure in the hydraulic system varies between approx. 2,520 – 3,500 psig. The high force is approx. five times stronger than the low force and is only exerted when the plastic material is injected into the mold.

For injection unit operation transverse to the parting line, the injection unit is centeringly fastened to the auxiliary cylinders 6a, 6b with the aid of the supporting struts 7, that is, the supporting struts 7 are coaxially connected to the auxiliary cylinders. The connection is provided on a frontal side of the auxiliary cylinders and is easily removed.

Figure 7:
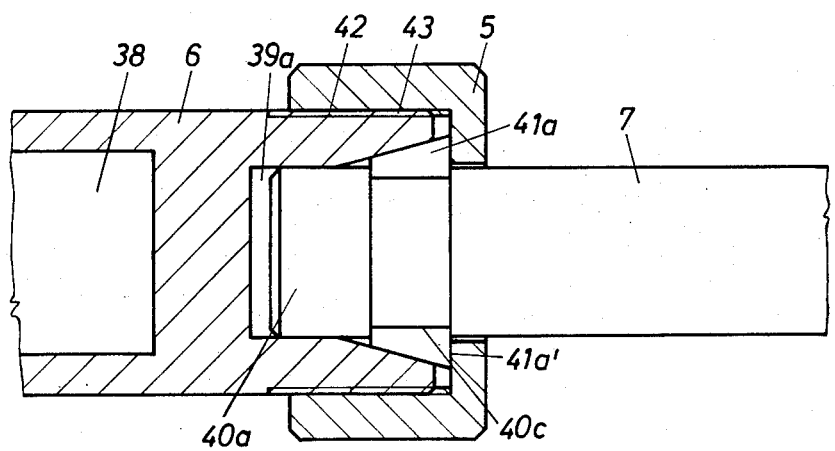
FIG. 7 is a sectional view through the connecting device for the injection unit.
Figure 9:
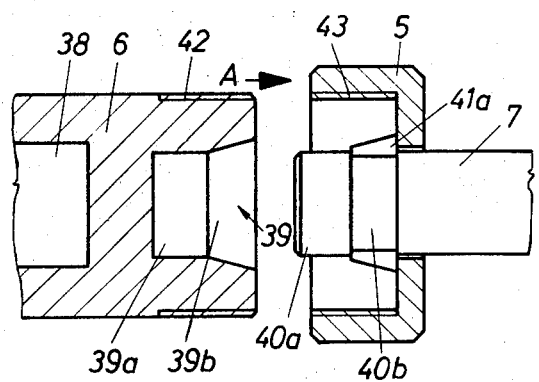
FIG. 9 shows the arrangement of FIG. 7 to a smaller scale with the supporting strut released.
Figure 8:
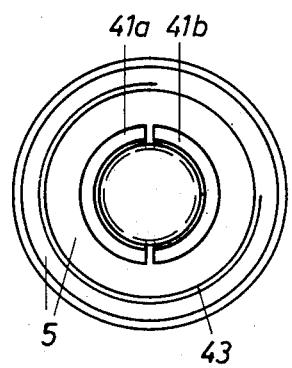
FIG. 8 is a view in the direction A of FIG. 9 of the parts of the connecting device for the injection unit sitting on the supporting strut.

As can best be seen in FIGS. 7–9, the free ends of the auxiliary cylinders 6a, 6b form a centering chamber 39 which includes a cylindrical portion 39a and a funnel-shaped portion 39b. The free ends of the supporting struts 7 are adapted to be inserted within the chambers 39. These free ends are constituted by a stepped cylindrical portion including a larger diameter portion 40a and a smaller diameter portion 40b. The smaller diameter portion 40b forms along with the larger diameter portion 40a and the remainder of the strut 7 an appropriately dimensioned groove 40c into which a pair of ring segments 41a, 41b are inserted. An accurate fit of the large diameter portions 40a in the cylindrical portions 39a of the centering chambers 39 is not required. The centering of the struts 7 is effected with the aid of the ring segments 41a, 41b. The ring segments are formed as wedges with an approximately trapezoidal cross section and have outer surfaces which extend beyond the outer surfaces of the large diameter portions 40a and the remainder of the strut 7. The inclination of the outer surface of the ring segments with respect to the axis of the auxiliary cylinders or the supporting struts, respectively, corresponds to the inclination of the inner surface of the funnel-shaped portions 39b.

The outer surface of the auxiliary cylinders 6a, 6b surrounding the centering chamber 39 is provided with threads 42. A cap screw 5 is provided which has threads 43 disposed on an inner surface thereof. The cap screw 5 and the auxiliary cylinders preferably have their threads 43 and 42, respectively, in engagement when the struts 7 are in engagement with the auxiliary cylinders 6a, 6b. Since the ring segments 41a, 41b radially extend beyond the outer surface of the supporting struts 7, there results a contact surface 41a', 41b' against which a radially inwardly directed flange of the cap screw 5 may abut upon tightening the cap screw 5 on the threaded ends of the cylinders 6a, 6b, the radially inwardly directed flange causes the outer surfaces of the ring segments 41a, 41b to press against the inner surfaces of the funnel-shaped portions 39b of the centering chamber 39. Thus, the described connecting and centering device including the cap screw 5 and the ring segments 41a, 41b permits relatively easy and rapid release of the injection unit when operating to inject transversely to the parting line. Accordingly, in a relatively quick and easy manner, the injection unit can be disengaged from a transverse injecting operation to a longitudinal injecting operation. In the latter case, the supporting struts 7 would be held in the connecting sleeves of a mold piece, preferably a carriage which itself is supported by the cylinder carrying mold assembly 1.

As can best be seen in FIG. 1, the supporting struts 7 of the injection unit, are symmetrically disposed to the injection axis a—a of the injection unit and coaxial with the auxiliary cylinders 6a, 6b when the unit is operating to inject transverse to the parting line of the mold. The struts 7 simultaneously serve as supporting struts and as the piston rods for the stationary pistons 8, which are mounted in bores of a bridge 9. The bridge 9 together with the cylinder covers 18 and 19 and the piston 8 forms the hydraulic actuating cylinders which, in the illustrated embodiment, move the injection unit towards and away from the mold.

The bridge 9 has a central, radially symmetrical extension 9' which extends in the direction of the mold and which at its frontal side has formed therein a cooling channel 10. The cooling channel 10 encloses the rearward section of a plasticizing cylinder 20 of the injection unit.

The pistons 8 are formed by first placing two spaced annular grooves 7' into the piston rod or struts 7. Into these grooves two ring segments 8a are inserted which extend radially beyond the outer surface of the piston rod 7. Holding rings 8b with an L-shaped cross section are provided. These holding rings abut at the frontal faces of the ring segments 8a, with one of these holding rings being radially slit. Rings 8c are disposed at the frontal faces of the abutment rings 8a. The rings 8c have disposed therebetween an elastic sealing ring 8d. The elastic sealing ring 8d has an annular cross section and is limited in its lateral movement by the rings 8c.

Figure 6:
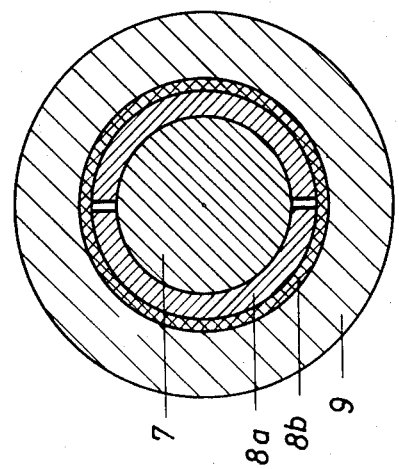
FIG. 6 is a sectional view along the line VI—VI of FIG. 5.
Figure 5:
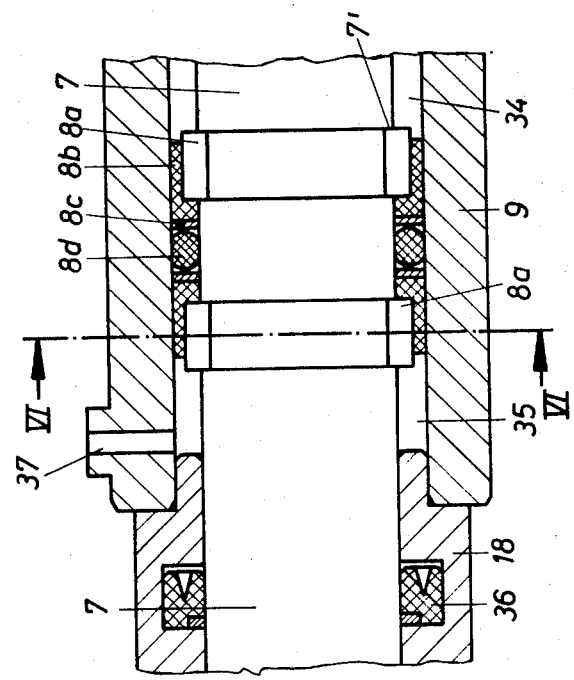
FIG. 5 is a sectional view through the stationary piston of an injection unit hydraulic actuation cylinder according to the present invention.

The pistons 8, struts 7 and bridge 9 divide the bore within which the pistons are mounted into chambers 34, 35. If one of the cylinder chambers 34 or 35 shown in FIGS. 5 and 6 is charged with a pressure medium, the sealing ring 8d will thus be pretensioned, that is, the holding rings 8b, when charged by the pressure medium, are axially displaced and act to deform the sealing ring 8d via the rings 8c. By deforming the ring 8d an especially efficient seal with the inner wall of the cylinder chamber is effected. That is, an optimum contact area is established between the ring 8d and the inner wall of the cylinder chamber resulting in an optimum seal with reduced ring wear.

During fabrication, the rings 8c and 8d along with one of the rings 8b of the piston 8 can be placed over the piston rod 7 except for the finally applied radially slit elastic holding ring 8b.

The cylinder covers 18 are sealed with the aid of sealing rings 36 to the piston rod or strut 7. The seals 36 have an annular notch which has a V-shaped cross section.

The plasticizing cylinder 20 which is provided with heating bands 21 is also provided with a heatable open nozzle 22. A hydraulic cylinder 23 with the piston 45 is flanged to the rear of the supporting bridge 9. A wedge element 47 secures the piston 45 against rotation in that it is firmly anchored in the cylinder 23 and also in an axial groove of the piston 45. The hydraulic cylinder 23 and piston 45 which are mounted to the bridge 9 to be coaxial with the injection axis exclusively serve to remove excess pressure in the preplasticized material accumulated in front of the conveying worm 16 in order to prevent this material from escaping after the open nozzle 22 is removed from the mold. The lifting stroke of the piston 45 will, therefore, be referred to hereinafter as the relaxation stroke.

The piston rod 46 of the piston 45 is indirectly connected with the conveying worm 16 via a releasable clutch 33. That is, the piston 45 and its hollow piston rod 46 have passing therethrough a drive spindle 15 which is mounted by a radial bearing 13 within a cylinder 17 to a collar 12 and thereby to a piston 11. The spindle 15 connects a drive motor 27 with the conveying worm 16 by reason of the spindle 15 being in turn connected to the clutch 33 and to a drive shaft 27' of the rotary drive 27 by a coupling 28. The piston 45 is, therefore, rigidly connected with the piston 11 of the central hydraulic cylinder 17. The piston 11 is formed by the cup-shaped free end of the hollow piston rod 46. The piston 11 is connected with the conveying worm 16 via an axial pressure bearing 14 which is mounted to the hollow drive spindle 15 between a supporting flange 15' and a frontal face of the piston 11. The axial pressure bearing 14 permits the relaxation stroke of the piston 45. The cylinder 17, which is formed by the supporting bridge 9, serves exclusively to inject plastic material into the mold.

The hydraulic cylinder 23, piston 45 and piston rod 46 define a chamber 24. The purpose of this chamber will become clear by the description set forth below.

With the aid of a drive pinion 29 on the coupling 28, a revolution counter for the speed of the conveying worm 16 is driven.

The injection unit operates as follows:

In the operating position according to FIG. 1, the injection of the plastic material into the mold has just been completed. A quantity of plastic material sufficient for the next element to be molded then accumulates in front of the conveying worm 16. This is known as the preplasticizing phase. The rotating conveying worm 16 thereby retreats under the accumulation pressure of the collecting material. Upon completion of the preplasticizing phase, the drive motor 27 is stopped. Thereafter, the cylinder chamber 24 of the hydraulic cylinder 23 is charged with a pressure medium, and thus the piston 45 is charged. The piston 45 generally performs a stroke of short length, i.e., of about 1 to 15 mm, so that the conveying worm 16 is pulled back by that amount. Since the plasticizing cylinder 20 is axially fixed to the bridge 9, the relaxation stroke of the piston 45 produces a relative movement between the worm 16 and the injection cylinder 17 which causes the preplasticized material to relax. As a result of the relaxation stroke the worm 16, the shaft 15, the piston 11, the piston rod 46, the piston 45, the housing 26 and the drive 27 are moved axially towards the right when viewed in FIG. 1. After the relaxation stroke the rearward chambers 35 are charged with a pressure medium and the injection unit is removed from the mold without any plastic material escaping from the open nozzle 22. It is significant that now the thermal contact betwen the nozzle 22 and the mold is interrupted so that no heat exchange can take place between the nozzle and the mold. Before the onset of the injection stroke, the injection cylinder 17 is again placed onto the mold by charging the forward cylinders 34. The injection stroke is then effected in that the injection cylinder 17 is charged with a pressure medium.

With an injection molding machine of the above type it is possible to process thermoplastics, duroplastics, elastomers and, if the machine is constructed as a die casting machine, also metals.

It will be understood that the above description of the present invention is susceptible to various modifications, changes and adaptations, and the same are intended to be comprehended within the meaning and range of equivalents of the appended claims.

I claim:

1. In an injection molding machine having at least one injection unit which can be releasably connected to a mold clamping unit in such a manner that injection of a plastic material is possible transverse to the parting line of the mold, with the injection unit including a plurality of elongated struts, and with the mold clamping unit including a cylinder carrying mold assembly comprising a plurality of hydraulic pressure cylinders within which a closing pressure for the mold is developed, a plurality of auxiliary cylinders within which an opening pressure for the mold is developed, and a piston rod extending outwardly from each pressure cylinder and terminating in a free end, the free ends of the piston rods defining a support for a carrier, the cylinder carrying mold assembly supporting at a frontal side a stationary mold half while a movable mold half is supported by the carrier, the auxiliary cylinders each being coaxially connected at one end thereof to a respective one of the hydraulic pressure cylinders, the pistons of said auxiliary cylinders forming a unit of movement with the pistons of the hydraulic pressure cylinders, the improvement comprising releasable fastening means for centering and releasably fastening the supporting struts of the injection unit coaxially to the auxiliary cylinders, and wherein the injection unit comprises a bridge within which a plurality of bores are formed, said bores serving as hydraulic actuating cylinders.

2. An injection molding machine as defined in claim 1 wherein each of said hydraulic actuating cylinders includes a stationary piston mounted therein, and wherein the supporting struts simultaneously constitute the piston rods on which the stationary pistons are mounted and the supporting struts for the inection unit, with the aid of which the injection unit is moved toward and away from the mold.

3. An injection molding machine as defined in claim 1, wherein the injection unit further includes a plasticizing cylinder which passes through said cylinder carrying mold assembly, and wherein the supporting struts are disposed symmetrically to an injection axis defined by the injection unit.

4. An injection molding machine as defined in claim 1, wherein the injection unit further includes a conveying worm, and wherein said bridge includes a central bore within which a piston is mounted, said conveying worm being connected to said piston and forming with said bore and piston a hydraulic injection cylinder.

5. An injection molding machine as defined in claim 1, wherein each of the plurality of auxiliary cylinders is provided at its other ends with a central centering chamber into which the free ends of the supporting struts are mounted.

6. An injection molding machine as defined in claim 5, wherein said fastening means includes a plurality of ring segments and a plurality of cap screws, and wherein the supporting struts are provided with annular grooves at their free ends which hold thereon said ring segments, said ring segments operatively associated with said centering chambers to aid in centering the supporting struts in said centering chambers, said ring segments being secured within said grooves with the aid of said cap screws.

7. An injection molding machine as defined in claim 6, wherein the ring segments have a trapezoidal cross section, and wherein each centering chamber includes a funnel-shaped portion, the inclination of the outer surface of said ring segments with respect to the longitudinal axes of the struts corresponding to the inclination of the inner surface of the funnel-shaped portions.

8. An injection molding machine as defined in claim 4, wherein the supporting struts are provided with a pair of spaced annular grooves, and wherein the stationary pistons comprise a ring segment inserted into each annular groove, a pair of holding rings in abutment one each with the ring segments, said holding rings having an L-shaped cross section, contacting rings contacting the frontal edge of said holding rings, and a sealing ring disposed between said contacting rings.

9. An injection molding machine as defined in claim 8, wherein the sealing ring has a circular cross section and is pretensioned, and wherein said holding rings are fabricated of elastic material with one of the pair of holding rings being radially slit.

10. An injection molding machine as defined in claim 4, wherein the injection unit further includes a rotary drive, a drive shaft, a first coupling means, and a second coupling means, said rotary drive connected to said drive shaft by said second coupling means and said conveying worm connected to said drive shaft by said first coupling means.

11. An injection molding machine as defined in claim 4, wherein the injection unit further includes a continuously open nozzle and a hydraulic cylinder which is coaxial with the injection cylinder and supported by the bridge, said hydraulic cylinder includes a piston mounted therein which forms a unit of movement with the piston of said injection cylinder, said hydraulic cylinder operatively associated with said bridge in order to remove the pressure developed by the material accumulated at the front portion of the conveying worm prior to an injection stroke.

12. An injection molding machine as defined in claim 1, wherein the injection unit further includes a bridge movably supported by said struts; a plasticizing cylinder affixed to and carried by said bridge; means defining a central bore in said bridge; a piston slideably disposed in and cooperating with said central bore to form therewith a hydraulic injection cylinder; a conveying worm rotatably and axially slidably disposed in said plasticizing cylinder; a drive shaft connected to said conveying worm and passing through said piston; and means connecting said drive shaft to said piston for effecting an axial movement of said conveying worm upon displacement of said piston.

* * * * *

Dedication 3,788,788.—*Karl Hehl*, Lossburg, Wurttemberg, Germany. INJECTION MOLDING MACHINE. Patent dated Jan. 29, 1974. Dedication filed May 14, 1976, by the inventor.

Hereby dedicates to the Public the entire remaining term of said patent.

[*Official Gazette June 8, 1976.*]